(12) United States Patent
Shiepe et al.

(10) Patent No.: US 7,166,382 B2
(45) Date of Patent: Jan. 23, 2007

(54) METHOD AND APPARATUS FOR IMPROVED FLUID FLOW WITHIN AN ELECTROCHEMICAL CELL

(75) Inventors: Jason K. Shiepe, Middletown, CT (US); Trent M. Molter, Glastonbury, CT (US); Lawrence C. Moulthrop, Jr., Windsor, CT (US)

(73) Assignee: Proton Energy Systems, Inc., Rocky Hill, CT (US)

( * ) Notice: Subject to any disclaimer, the term of this patent is extended or adjusted under 35 U.S.C. 154(b) by 840 days.

(21) Appl. No.: 09/965,630

(22) Filed: Sep. 27, 2001

(65) Prior Publication Data

US 2006/0286429 A1    Dec. 21, 2006

Related U.S. Application Data

(60) Provisional application No. 60/235,743, filed on Sep. 27, 2000, provisional application No. 60/235,821, filed on Sep. 27, 2000, provisional application No. 60/235,974, filed on Sep. 28, 2000.

(51) Int. Cl.
*H01M 8/02* (2006.01)
*H01M 4/86* (2006.01)

(52) U.S. Cl. .............................. 429/38; 429/39; 429/44

(58) Field of Classification Search .................. 429/34, 429/38, 39, 40, 44, 45
See application file for complete search history.

(56) References Cited

U.S. PATENT DOCUMENTS

| | | | |
|---|---|---|---|
| 4,011,360 A | 3/1977 | Walsh | |
| 4,317,864 A | 3/1982 | Strasser | 429/36 |
| 4,732,660 A | 3/1988 | Plowman et al. | 204/265 |
| 5,009,968 A | 4/1991 | Guthrie et al. | 429/26 |
| 5,082,596 A | 1/1992 | Fukuda et al. | |
| 5,296,570 A | 3/1994 | Earls et al. | |
| 5,324,565 A | 6/1994 | Leonida et al. | 428/131 |
| 5,466,354 A | 11/1995 | Leonida et al. | 304/252 |
| 5,498,644 A | 3/1996 | Reo | |
| 5,580,672 A | 12/1996 | Zagala, III et al. | 204/265 |
| 5,585,038 A | 12/1996 | Kirmanen et al. | |
| 5,641,586 A | 6/1997 | Wilson | |

(Continued)

FOREIGN PATENT DOCUMENTS

EP    0929112 A2    7/1999

(Continued)

OTHER PUBLICATIONS

Entry of "sintering," Hawley's Condensed Chemical Dictionary, 14th edition, John Wiley and Sons, Inc., 2002.*

(Continued)

*Primary Examiner*—Jonathan Crepeau
(74) *Attorney, Agent, or Firm*—Cantor Colburn LLP (57) ABSTRACT

Treated porous flow field members are used to support membranes in electrochemical cells and to enhance fluid flow to and from the membrane. The treated porous includes a support material having at least a portion thereof treated with a quantity of hydrophobic polymer, a quantity of hydrophilic polymer, or a quantity of a mixture of a hydrophobic polymer and a hydrophilic polymer. Depending on the type of treatment and the placement of the polymer-treated porous support, various fluid flow enhancements are attained.

17 Claims, 3 Drawing Sheets

U.S. PATENT DOCUMENTS

| | | | |
|---|---|---|---|
| 5,656,690 A | | 8/1997 | Pradl et al. |
| 5,677,074 A | * | 10/1997 | Serpico et al. ................. 429/43 |
| 5,824,199 A | | 10/1998 | Simmons et al. ........... 204/265 |
| 5,952,119 A | | 9/1999 | Wilson |
| 6,024,848 A | * | 2/2000 | Dufner et al. .............. 204/252 |
| 6,030,718 A | * | 2/2000 | Fuglevand et al. ............ 429/26 |
| 6,171,719 B1 | | 1/2001 | Roy et al. ..................... 429/39 |
| 2001/0008722 A1 | * | 7/2001 | Speranza et al. ............. 429/44 |
| 2001/0036523 A1 | * | 11/2001 | Sobolewski ................ 428/36.9 |

FOREIGN PATENT DOCUMENTS

| | | | |
|---|---|---|---|
| WO | WO 97/13287 | | 4/1997 |
| WO | WO 98/23794 | | 6/1998 |
| WO | WO 98/40537 | | 9/1998 |
| WO | WO 99/56333 | | 11/1999 |
| WO | WO 00/39363 | * | 7/2000 |
| WO | WO 01/61777 A2 | | 8/2001 |

OTHER PUBLICATIONS

Kaysser, W. A. et al., "Powder Metallurgy and Sintered Materials: 10. Parts with Inherent, Functional Porosity," Ullmann's Encylopedia of Industrial Chemistry, [online] posted Jun. 15, 2000.*

"Solid Polymer Electrolyte Water Electrolysis Technology Development for Large-Scale Hydrogen Production," Report for the Period Oct. 1977-Nov. 1981 by General Electric Company, NTIS Order No. DE82010876, e.g., at pp. 66 and 90.

"Industrial and Government Applications of SPE Fuel Cell and Electrolyzers" by T.G. Cooker, A. B. LaConti and L.J. Nuttall; Case Western Symposium on "Membranes and Ionic and Electronic Conducting Polymer," Cleveland, Ohio May 17-19, 1982, p. 14.

International Search Report, International Application No. PCT/US 01/30257, International Filing Date: Sep. 27, 2001, 8 pages, published with WO 02/27846, Feb. 4, 2002.

* cited by examiner

METHOD AND APPARATUS FOR IMPROVED FLUID FLOW WITHIN AN ELECTROCHEMICAL CELL

CROSS-REFERENCE TO RELATED APPLICATIONS

This application claims priority to U.S. Provisional Patent Application Ser. No. 60/235,743 filed on Sep. 27, 2000; U.S. Provisional Patent Application Ser. No. 60/235,821 filed on Sep. 27, 2000; and, U.S. Provisional Patent Application Ser. No. 60/235,974 filed on Sep. 28, 2000, all of which are fully incorporated herein by reference.

BACKGROUND

The present invention relates to electrochemical cells, and more particularly to flow field membrane for supporting membrane components and enhancing fluid flow in electrochemical cells.

Figure 1:
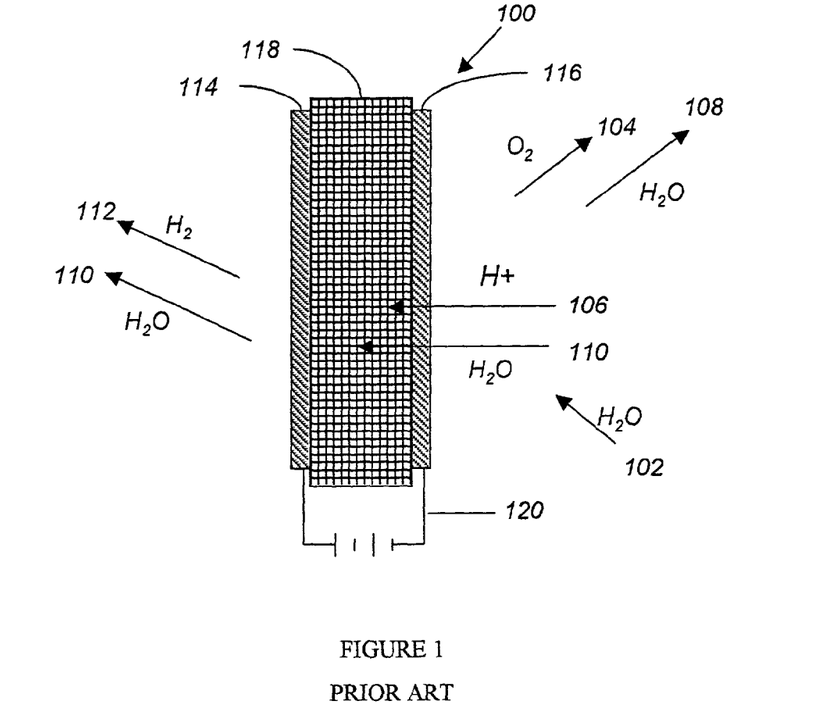
FIG. 1 is a schematic diagram of a prior art fuel cell showing an electrochemical reaction.

Electrochemical cells are energy conversion devices, usually classified as either electrolysis cells or fuel cells. A proton exchange membrane electrolysis cell can function as a hydrogen generator by electrolytically decomposing water to produce hydrogen and oxygen gas, and can function as a fuel cell by electrochemically reacting hydrogen with oxygen to generate electricity. Referring to FIG. 1, which is a partial section of a typical anode feed electrolysis cell 100 ("cell 100"), process water 102 is fed into cell 100 on the side of an oxygen electrode (anode) 106 to form oxygen gas 104, electrons, and hydrogen ions (protons) 106. The reaction is facilitated by the positive terminal of a power source 120 electrically connected to anode 116 and the negative terminal of power source 120 connected to a hydrogen electrode (cathode) 114. The oxygen gas 104 and a first portion 108 of the process water exit cell 100, while protons 106 and a second portion 110 of process water migrate across a proton exchange membrane 118 to cathode 114 where hydrogen gas 112 is formed.

Another typical water electrolysis cell using the same configuration as is shown in FIG. 1 is a cathode feed cell, wherein process water is fed on the side of the hydrogen electrode. A portion of the water migrates from the cathode across the membrane to the anode where hydrogen ions and oxygen gas are formed due to the reaction facilitated by connection with a power source across the anode and cathode. A portion of the process water exits the cell at the cathode side without passing through the membrane.

A typical fuel cell uses the same general configuration as is shown in FIG. 1. Hydrogen, from hydrogen gas, methanol, or other hydrogen source, is introduced to the hydrogen electrode (the anode in fuel cells), while oxygen, or an oxygen-containing gas such as air, is introduced to the oxygen electrode (the cathode in fuel cells). Water can also be introduced with the feed gas. Hydrogen gas electrochemically reacts at the anode to produce protons and electrons, wherein the electrons flow from the anode through an electrically connected external load, and the protons migrate through the membrane to the cathode. At the cathode, the protons and electrons react with oxygen to form water, which additionally includes any feed water that is dragged through the membrane to the cathode. The electrical potential across the anode and the cathode can be exploited to power an external load.

In other embodiments, one or more electrochemical cells can be used within a system to both electrolyze water to produce hydrogen and oxygen, and to produce electricity by converting hydrogen and oxygen back into water as needed. Such systems are commonly referred to as regenerative fuel cell systems.

Electrochemical cell systems typically include one or more individual cells arranged in a stack, with the working fluids directed through the cells via input and output conduits formed within the stack structure. The cells within the stack are sequentially arranged, each including a cathode, a proton exchange membrane, and an anode (hereinafter "membrane electrode assembly", or "MEA"). Each cell typically further comprises a first flow field in fluid communication with the cathode and a second flow field in fluid communication with the anode. The MEA may be supported on either or both sides by porous screen packs or bipolar plates disposed within the flow fields, and which may be configured to facilitate membrane hydration and/or fluid movement to and from the MEA. In addition, to maintain intimate contact between cell components especially across the MEA, uniform compression is applied to the cell components using pressure pads or other compression means to provide even compressive force from within the electrochemical cell.

In addition to providing mechanical support for the MEA, flow field members such as screen packs and bipolar plates preferably facilitate fluid movement and membrane hydration. In a fuel cell for example, process water is directed toward the anode, which must remain wet for optimal performance. Process water transported to the cathode via attachment to hydrogen ions is preferably directed away from the cathode, as well as any resultant water. Porous flow field members can also serve as gas diffusion media to effectuate proper transport of the oxygen and hydrogen gas. Increasing the rates of transport and uniformity of distribution of the cell fluids (e.g. liquid water, oxygen gas and hydrogen gas) throughout the electrochemical cell increases operating efficiencies.

Conventionally, porous flow field members have been formed of carbon-based materials such as graphite. However, the carbon-based materials are subject to oxidative degradation due to the presence of oxygen, thereby resulting in decreased cell performance. Porous titanium supports have also been used, as disclosed in publications of the General Electric Company, specifically "Solid Polymer Electrolyte Water Electrolysis Technology Development for Large-Scale Hydrogen Production," Final Report for the Period October 1977–November 1981 by General Electric Company, NTIS Order Number DE82010876, e.g., at pages 66 and 90. Porous titanium supports were shown to improve water flow rates and current densities compared to cells employing perforated foils. Additionally, "Industrial and Government Applications of SPE Fuel Cell and Electrolyzers" by T. G. Cooker, A. B. LaConti and L. J. Nuttall (General Electric Company) presented at the Case Western Symposium on "Membranes and Ionic and Electronic Conducting Polymer," Cleveland, Ohio May 17–19, 1982, e.g., page 14, discloses use of a porous, rigid titanium sheet on the anode and carbon fiber paper on the cathode for the purpose of preventing the membrane and electrode assembly from deforming into the flow fields.

While existing porous flow field members are suitable for their intended purposes, there nonetheless remains a perceived need for improved porous flow field members, in particular more robust members with improved water and gas transport properties.

SUMMARY OF THE INVENTION

The above-described drawbacks and deficiencies are alleviated by a method and apparatus for improving fluid flow within electrochemical cells. An electrochemical cell accordingly comprises a first electrode; a second electrode; a membrane disposed between and in intimate contact with the first electrode and the second electrode; a first flow field in fluid communication with the first electrode opposite the membrane; a second flow field in fluid communication with the second electrode opposite the membrane; and a flow field member in fluid communication with the first flow field opposite the first electrode, wherein the flow field member comprises a porous support modified to provide a selected porosity, a selected hydrophobicity, or a combination thereof. In one embodiment, the porous support is modified by disposing electrically conductive material or elastomeric material into the voids of the support. In another embodiment, the porous support is modified by the placement of hydrophobic layers between layers of porous support material. In a particularly preferred embodiment, the flow field member comprises at least two layers of a porous support having differing hydrophobicity and/or porosity.

In another embodiment, in an electrochemical cell comprising a first electrode; a second electrode; a membrane disposed between and in intimate contact with the first electrode and the second electrode; a first flow field in fluid communication with the first electrode opposite the membrane; a second flow field in fluid communication with the second electrode opposite the membrane, a method for managing fluid flow comprises introducing a quantity of fluid into the first flow field; passing the fluid through a graded, porous flow field member in fluid communication with the first flow field opposite the first electrode, wherein the flow field member comprises a porous support modified to provide a selected porosity, a selected hydrophobicity, or a combination thereof; and contacting the fluid with the first electrode.

The above discussed and other features and advantages of the present invention will be appreciated and understood by those skilled in the art from the following detailed description and drawings.

BRIEF DESCRIPTION OF THE DRAWINGS

Referring now to the drawings, which are meant to be exemplary and not limiting, and wherein like elements are numbered alike in the several Figures.

DETAILED DESCRIPTION OF THE PREFERRED EMBODIMENTS

Porous flow field members are provided for management of fluid flow in an electrochemical cell. Such porous flow field membranes comprise a porous support having a selected hydrophilicity and/or porosity. Flow field members having a graded hydrophilicity and/or graded porosity transversely across the flow field member are especially preferred. The hydrophobicity and/or porosity gradient can improve the directional flow and fluid distribution to and from the electrodes under the pressure and temperature conditions within electrochemical cells. When the porous flow field members are appropriately oriented, the hydrophobicity and/or porosity gradients facilitate the movement of water or other system fluids, thus allowing these fluids to flow freely either to or away from the electrodes, depending on the type of the electrochemical cell and mode of operation.

Although the invention is described in relation to a proton exchange membrane electrochemical cell employing hydrogen, oxygen, and water, other types of electrochemical cells and/or electrolytes may be used, including, but not limited to, phosphoric acid, and potassium hydroxide, and the like. Various reactants can also be used, including, but not limited to, hydrogen, bromine, oxygen, air, chlorine, and iodine. Upon the application of different reactants and/or different electrolytes, the flows and reactions are understood to change accordingly, as is commonly understood in relation to that particular type of electrochemical cell.

Figure 2:
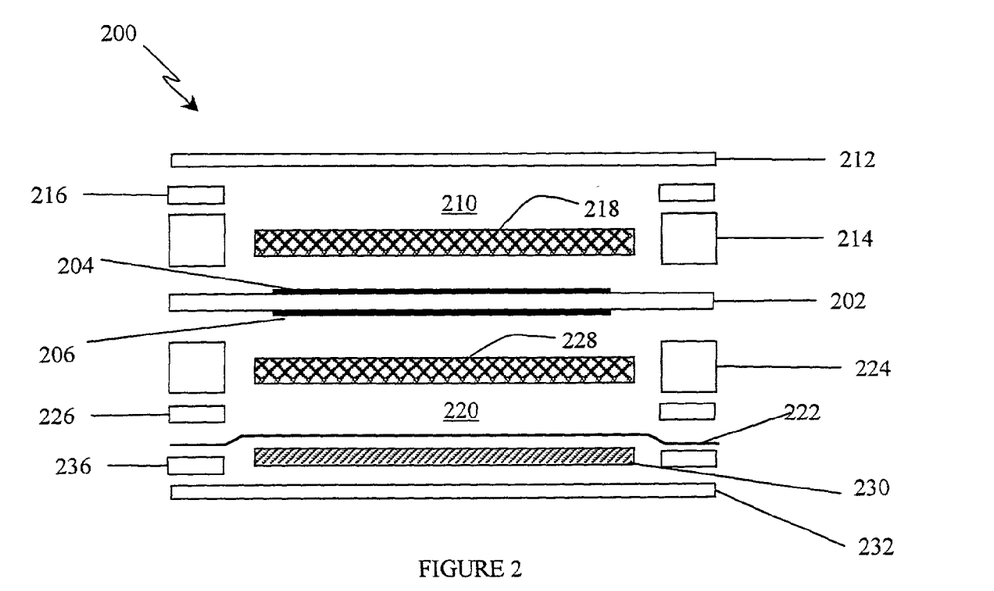
FIG. 2 is a schematic, exploded, cross-sectional view of an electrochemical cell showing an exemplary placement of a porous flow field member.

Referring to FIG. 2, an electrochemical cell system 200 (cell system 200) suitable for operation as an anode feed electrolysis cell, cathode feed electrolysis cell, fuel cell, or regenerative fuel cell is schematically shown. Thus, while the discussion below is directed to an anode feed electrolysis cell, cathode feed electrolysis cells, fuel cells, and regenerative fuel cells are also within the scope of the present invention. Cell system 200 is typically one of a plurality of cell systems employed in a cell stack as part of an electrochemical cell system. When cell system 200 is used as an electrolysis cell, power inputs are generally from about 1.48 volts to about 3.0 volts, with current densities from about 50 $A/ft^2$ (amperes per square foot) to about 4,000 $A/ft^2$. When used as a fuel cell, power outputs range from about 0.4 volts to about 1 volt, and from about 0.1 $A/ft^2$ to about 10,000 $A/ft^2$ and above. Cell system 200 is capable of operating at cell pressures up to or exceeding about 100 psi, preferably about 500 psi, more preferably up to or exceedingly about 2,500 psi, or even more preferably about 10,000 psi. The number of cell systems within the stack, and the dimensions of the individual cell systems is scalable to the cell power output and/or gas output requirements.

Cell 200 includes a membrane 202 having a first electrode (e.g., an anode) 204 and a second electrode (e.g., a cathode) 206 disposed on opposite sides thereof. Flow fields 210, 220, which are in fluid communication with electrodes 204 and 206, respectively, are defined generally by the regions proximate to, and bounded on at least one side by, each electrode 204 and 206 respectively. A porous flow field member 228, which will be discussed in further detail below, is disposed within flow field 220 between and in fluid communication with electrode 206 and, optionally, a pressure pad separator plate 222. A pressure pad 230 is typically disposed between optional pressure pad separator plate 222 and a cell separator plate 232. Pressure pad 230 is also optionally porous to allow passage of water or system gases. Cell separator plate 232 is disposed adjacent to pressure pad 230. A frame 224 generally surrounds flow field 220. An optional gasket 226 is disposed between frame 224 and pressure pad separator plate 222 generally for enhancing the seal within the reaction chamber defined on one side of cell system 200 by frame 224, pressure pad separator plate 222 and electrode 206. An optional gasket 236 may be disposed between pressure pad separator plate 222 and cell separator pad 232 enclosing pressure pad 230.

Another porous flow field member 218 is disposed in flow field 210. A frame 214 generally surrounds porous support 218, a cell separator plate 212 is disposed adjacent porous support 218 opposite oxygen electrode 204, and an optional gasket 216 is disposed between frame 214 and cell separator plate 212, generally for enhancing the seal within the reaction chamber defined by frame 214, cell separator plate 212 and the oxygen side of membrane 202. The cell components, particularly cell separator plates 212, 232, frames 214, 224, and gaskets 216, 226, and 236 are formed with the suitable manifolds or other conduits as is known to one skilled in the art.

Membrane 202 comprises electrolytes that are preferably solids or gels under the operating conditions of the electrochemical cell. Useful materials include proton conductive ionomers and ion exchange resins. Useful proton conductive ionomers include complexes comprising an alkali metal salt, alkali earth metal salt, a protonic acid, or a protonic acid salt. Counter-ions useful in the above salts include halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, and the like. The alkali metal salt, alkali earth metal salt, protonic acid, or protonic acid salt is complexed with one or more polar polymers such as a polyether, polyester, or polyimide, or with a network or cross-linked polymer containing the above polar polymer as a segment. Useful polyethers include polyoxyalkylenes, such as polyethylene glycol, polyethylene glycol monoether, and polyethylene glycol diether; copolymers of at least one of these polyethers, such as poly(oxyethylene-co-oxypropylene) glycol, poly(oxyethylene-co-oxypropylene) glycol monoether, and poly(oxyethylene-co-oxypropylene) glycol diether; condensation products of ethylenediamine with the above polyoxyalkylenes; and esters, such as phosphoric acid esters, aliphatic carboxylic acid esters or aromatic carboxylic acid esters of the above polyoxyalkylenes. Copolymers of, e.g., polyethylene glycol with dialkylsiloxanes, maleic anhydride, or polyethylene glycol monoethyl ether with methacrylic acid are known in the art to exhibit sufficient ionic conductivity to be useful.

Ion-exchange resins useful as proton conductive materials include hydrocarbon- and fluorocarbon-containing resins. Hydrocarbon-containing ion-exchange resins include phenolic resins, condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-containing ion-exchange resins can include hydrates of tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-containing resins having sulfonic, carboxylic and/or phosphoric acid functionality are preferred. Fluorocarbon-containing resins typically exhibit excellent resistance to oxidation by halogen, strong acids, and bases. One family of fluorocarbon-containing resins having sulfonic acid group functionality is NAFION™ resins (commercially available from E.I. du Pont de Nemours and Company, Wilmington, Del.).

Electrodes 204 and 206 comprise catalyst suitable for performing the needed electrochemical reaction (i.e., electrolyzing water to produce hydrogen and oxygen). Suitable electrodes comprise, but are not limited to, platinum, palladium, rhodium, carbon, gold, tantalum, tungsten, ruthenium, iridium, osmium, alloys thereof, and the like. Electrodes 204 and 206 can be formed on membrane 202, or may be layered adjacent to, but in contact with, membrane 202. Both techniques are known in the art.

Pressure pad 230 provides even compression between cell components, is electrically conductive, and therefore generally comprises a resilient member, preferably an elastomeric material, together with a conductive material. Suitable elastomeric materials include, but are not limited to silicones, such as, for example, fluorosilicones; fluoroelastomers, such as KALREZ® (commercially available from E.I. du Pont de Nemours and Company), VITON® (commercially available from E.I. du Pont de Nemours and Company), and FLUOREL® (commercially available from Minnesota Mining and Manufacturing Company, St. Paul, Minn.); and combinations thereof. Suitable electrically conductive materials include, but are not limited to, conductive metals and alloys and superalloys thereof, for example niobium; zirconium; tantalum; titanium; niobium; iron and iron alloys, for examples steels such as stainless steel; nickel and nickel alloys such as HASTELLOY™ (commercially available from Haynes International, Kokomo, Ind.); cobalt and cobalt superalloys such as ELGILOY™ (commercially available from Elgiloy® Limited Partnership, Elgin, Ill.) and MP35N™ (commercially available from Maryland Specialty Wire, Inc., Rye, N.Y.); hafnium; and tungsten, among others, with titanium preferred because of its strength, durability, availability, low cost, ductility, low density, and its compatibility with the electrochemical cell environment. Conductive carbon is also often used. Pressure pad 230 is optionally porous to allow passage of water or system gases.

Porous flow field members 218, 228 allow the passage of system fluids and conduct electrical current. The same or different embodiments of porous flow field members 218, 228, as will be discussed below in greater detail, can be utilized in the same electrochemical cell. In the alternative, either porous flow field member 218 or 228 may be replaced with a conventional flow field member, such as a screen pack, bipolar plate, or the like.

In one embodiment flow field members 218, 228 comprise a porous support modified to provide a selected porosity, a selected hydrophobicity, or both. For example, a porous support may be integrated with an electrically conductive material, which advantageously provides substantial mechanical strength in all directions to prevent cracking or breakage, as well as a selected porosity.

Suitable porous supports include screens, perforated sheets, pierced sheets, discretely etched sheets, sintered metal cloth, or woven mesh formed from metal or continuous strands of metal. In the alternative, the porous supports can comprise sintered powder or granular metal particles. Materials suitable for the porous supports comprise materials that are non-oxidizable at anodic potentials of less than about 4 volts. The porous supports are preferably non-oxidizable in electrochemical cell environments, and include but are not limited to materials such as niobium, zirconium, tantalum, titanium, steels such as stainless steel, nickel, and cobalt, and the like, and alloys and mixtures comprising at least one of the foregoing metals; ceramics, such as alumina; and mixtures comprising at least one of the forgoing metal and ceramic support materials. These materials are particularly useful to achieve a porous support having little or no lateral porosity (i.e., in the direction parallel to the major surface (face) of the membrane electrode assembly). Generally, the supports comprise flat sheets or structures of some other substantially flat form, typically about 0.005 to about 0.1 inches (about 0.127 and about 2.54 mm) thick, preferably about 0.005 to about 0.01 inches (about 0.127 and about 0.254 mm) thick.

The shape of the voids in the porous supports may be generally circular, non-circular (e.g., oval), polygonal (e.g., triangular, rectangular, pentagonal, hexagonal, and the like), non-geometric (e.g., diamonds and other elongated shapes), irregular, or combinations comprising at least one of the foregoing shapes.

An electrically conductive material is non-occlusively disposed within the voids of the porous support, i.e., is disposed in such a manner that a pre-determined or desired fraction of the original void volume of the porous support remains. The electrically conductive material may be provided in the form of particles, strands, or other forms, dimensioned such that the electrically conductive material may be placed within the voids, and not fully occlude the voids. Suitable electrically conductive materials include but are not limited to niobium; zirconium; tantalum; titanium; steels, such as stainless steel; nickel; cobalt; carbon; precious metals, such as gold; and mixtures and alloys comprising at least one of the foregoing electrically conductive materials, with titanium preferred.

In one method of integrating an electrically conductive material, an amount of electrically conductive material effective to provide substantial mechanical strength is disposed within the support, leaving voids, and the resultant structure is heated at a temperature effective to bond the electrically conductive material to the support, while maintaining the voids. In another method, an amount of electrically conductive material effective to provide substantial mechanical strength is combined with a fugitive material that burns off upon heating, and the combination is disposed within the voids of the support material. The impregnated support material is then heated to a temperature effective to drive off the fugitive material, but below the melting temperature of the electrically conductive material. Suitable fugitive materials include but are not limited to waxes, plastics, rubbers, and other materials having melting temperatures below the melting temperature of the electrically conductive material. The resultant porous support may further be sintered and compacted.

In addition to a selected porosity, the flow field member may also be provided with a selected hydrophobicity (conversely, hydrophilicity), by integrating a polymer with the porous support in an amount effective to affect fluid flow. The polymer may be hydrophobic or hydrophilic, or a mixture of hydrophobic and hydrophilic polymers. Suitable hydrophobic polymers include but are not limited to polytetrafluoroethylene (PTFE), commercially available under the trade name TEFLON® from E.I. du Pont deNemours, such as solutions sold under the trade designations "T-120 TEFLON® Solution" and "T-30 TEFLON® solution"; fluorinated ethylene propylene (FEP); polyvinylidinefluoride (PVDF); ethylene chlorotrifluoroethylene copolymer (ECTFE); ethylene tetrafluoroethylene (ETFE); perfluoroalkoxy (PFA); and tetrafluoroethylene (TFE) perfluoromethylvinylether (MFA) copolymer. Suitable hydrophilic polymers include but are not limited to proton conductive ionomers and ion exchange resins used to form the membrane, in particular fluorocarbon-containing ion exchange resins, such as the NAFION™ resins. Other hydrophilic polymers stable within an electrochemical cell environment may also be utilized depending on the degree of hydrophilicity desired.

The polymeric material may itself be made conductive, typically by the incorporation of electrically conductive particulate materials as is known in the art. Suitable electrically conductive particulate materials include but are not limited to the above-mentioned electrically conductive metals and alloys and superalloys thereof, preferably copper and nickel. Also useful are non-conductive particles coated with conductive materials, for example silver-coated glass sphores, as well as conductive, particulate carbon, for example acetylene blacks, conductive furnace black, superconductive furnace black, extra-conductive furnace black, vapor grown carbon fibers, carbon nanotubes, and the like. Copper, nickel, conductive carbon, or a combination thereof is presently preferred because of their conductivity, availability, low cost and compatibility with the electrochemical cell environment. The particular shape of the particles is not critical, and includes spheres, plates, whiskers, tubes, drawn wires, flakes, short fibers, irregularly-shaped particles, and the like. Suitable particle sizes and amounts vary widely, and are readily determined by one of ordinary skill in the art depending on factors including but not limited to the particular materials chosen, the desired elastomeric characteristics and conductivity of the pressure pad, the cost of the materials, the size of the pressure pad, the method of manufacture, and other considerations. Regardless of the exact size, shape, and composition of the conductive fillers particles, they should be thoroughly dispersed through the polymeric resin. Such compositions and their method of manufacture have been described, for example, in U.S. Pat. Nos. 4,011,360; 5,082,596; 5,296,570; 5,498,644; 5,585,038; and 5,656,690.

The polymer (or polymer mixture) can further include one or more fugitive materials, including but not limited to water, alcohols (such as 1-propanol, 2-propanol, or methanol), or other volatile organic compounds. Such fugitive materials are removed subsequent to integration to form voids.

There are a number of methods for integrating a porous support with a suitable polymer to result in a layer having a predetermined hydrophobicity and a predetermined void volume. In one embodiment, the porous support can be treated with a solution or suspension of the polymer by liquid brushing, spraying, dipping, vapor depositing, and combinations comprising at least one of the foregoing methods. In another method, the polymer or polymer mixture can be molded onto the support (by injection molding, e.g.). Two different polymers or polymer mixtures may be disposed on the porous support material in separate treatment steps, or two or more different polymers can be mixed together and then disposed on the porous support material. Either application method results in a polymer-treated porous support having regions with both hydrophobic and hydrophilic characteristics. In an exemplary method for attaining such a mixed hydrophobic/hydrophilic treated layer, an intimate mixture of hydrophobic material(s) (such as PTFE) and hydrophilic material(s) (such as NAFION™) is disposed on the porous support. The relative sizes and distribution of the areas having hydrophobic and hydrophilic characteristics are adjusted by the relative hydrophobicity/hydrophilicity, the relative quantities, the degree of mixing, and the like. In addition, micron-sized distribution of hydrophobic and hydrophilic areas on the porous supports may be obtained by vigorous mixing during disposition upon the porous supports.

It is also possible to incorporate catalyst material into polymer-treated porous supports. An integrated polymer-support layer may be formed as described above, followed by the step of depositing a catalyst material on one side of the support after it is formed. Alternatively, the catalyst material can be incorporated into the polymer prior to integration with a porous support. In still another approach, a quantity of catalyst is provided in a solid mixture with a support material and sintered integrally therewith to form the porous support. This porous support is subsequently treated with a hydrophobic and/or hydrophilic polymer.

Whether disposing a polymer or polymer mixture, the relative quantities of hydrophobic and hydrophilic polymers are readily determined by one of ordinary skill in the art, depending on the desired hydrophobic and/or hydrophilic characteristics of porous support 218, 228. In general, however, when employing a polymer mixture, the hydrophilic polymer generally comprises from about 0.1 weight percent ("wt. %") to about 95 wt. % based on the total weight of the mixture. Similarly, the amount of hydrophobic polymer, hydrophilic polymer, or mixture thereon used in the porous support will depend on the desired hydrophobic and/or hydrophilic characteristics of the porous support. In general, a mixture comprising from about 5 wt. % to about 95 wt. % based on the total weight of the mixture of support material and from about 5 wt. % to about 95 wt. % based on the total weight of the mixture of polymer or polymer mixture, and preferably from about 50 wt. % to about 80 wt. % based on the total weight of the mixture of support material, and from about 20 wt. % to about 50 wt. % based on the total weight of the mixture of polymer or polymer mixture are employed.

Another method for integrating a porous support with a polymer to result in a layer having a predetermined hydrophobicity and a predetermined void volume comprises threading or weaving a polymeric (preferably an elastomeric) thread or cord into a porous, electrically conductive support. For example, the electrically conductive material may be in the form of a sheet having openings suitable for weaving or threading the elastomeric material. Differing degrees of porosity may be achieved by differing the stitch or weave spacing, by using elastomeric material of different thickness, or by using electrically conductive materials with differing void volumes.

In this embodiment the elastomeric material is provided in a threadable or weavable form, generally having a width or diameter substantially less than the length. The cross-sectional shape of the elastomeric material can be circular, oval, square, rectangular, triangular, polygonal, or any other shape suitable for threading. Suitable elastomeric materials have a circular cross-section with a diameter of about 0.05 to about 0.1 inches (about 1.27 to about 2.54 mm), preferably about 0.075 to about 0.1 inches (about 1.9 to about 2.54 mm). Suitable elastomeric materials are preferably compatible with the electrochemical cell environment, fluids, and membrane, and therefore include but are not limited to those described above for use in pressure pads. For example, the elastomeric material can be a polytetrafluoroethylene such as VITON® in the form of a cord having a durometer of about 45 to about 90, preferably about 70 to about 75, and having a diameter of about 0.05 to about 0.1 inches (about 1.27 to about 2.54 mm), preferably about 0.075 to about 0.1 inches (about 1.9 to about 2.54 mm).

In general, the particular arrangements of porosity, hydrophilicity, and hydrophobicity will depend on the desired flow enhancement. It is generally to be expected that use of a hydrophobic flow field member adjacent to an electrode will enhance water flow away from the electrode and gas flow toward the electrode, while use of a hydrophilic flow field member will enhance water flow toward an electrode, and gas away from the electrode.

Treated flow field members, in particular graded porous flow field members, facilitate fluid transport within an electrochemical cell, and are particularly useful to improve the directional flow and water distribution to and from the membrane. When the porous flow field members are appropriately oriented, the porous flow field members wick the system fluids, thereby allowing such fluids to flow freely either to or away from the electrodes, depending on the type of electrochemical cell and the mode of operation. As a result, the electrochemical cell can operate at a lower electrical resistance thereby leading to higher current output densities in the case of fuel cells or fuel cell operation, and increased energy efficiency in the case of electrolysis cells or electrolysis cell operation.

Figure 3:
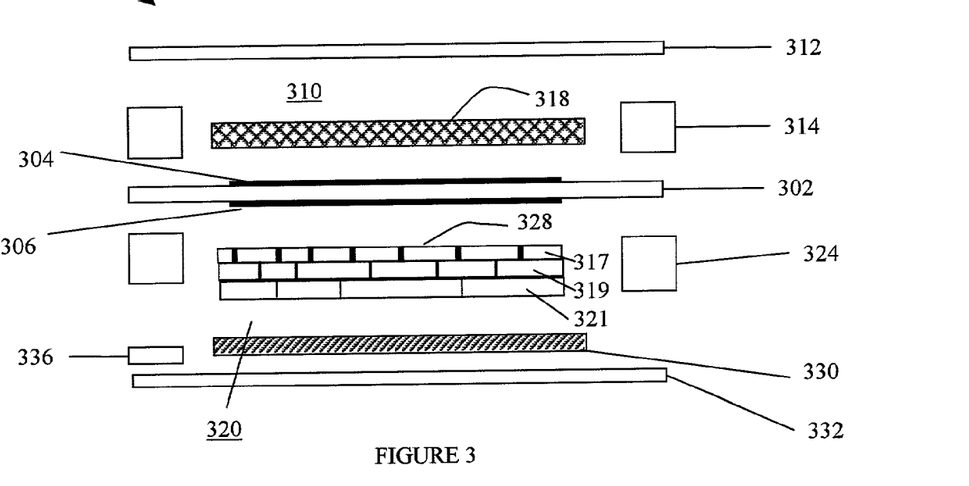
FIG. 3 is a schematic cross-sectional view of an exemplary graded, porous flow field member placed in an electrochemical cell.

An exemplary graded flow field member is illustrated in FIG. 3, and comprises a graded, porous flow field member 318 having graded porosity and/or hydrophobicity. The gradient is preferably established transversely across the flow field member, from cell separator plate 330 (or other similar element) to the electrode. As shown in FIG. 3, flow field member 318 comprises three layers 317, 319, 321, each having differing void volumes oriented in order of decreasing porosity such that a layer 317 possesses a void volume larger than a second porous layer 319, and the second porous layer 319 possesses a void volume larger than a third porous layer 321. Differing void volumes may be provided by differeing the size of the voids, the number of the voids, or both. Although it is shown in FIG. 3 that flow field member 318 is disposed within a flow field such that the first porous layer 319 having the largest void volume is disposed directly adjacent an electrode, the orientation of the gradient may also be reversed.

In still another embodiment, layers 321, 319 and 317 may have substantially the same void volume, but with each having increasingly more hydrophilic polymers integrated into each layer 321, 319, and 317. Conversely, layers 321, 319 and 317 may each comprise a porous support having the same hydrophilicity (i.e., integrated with the same polymer or polymer mixture), but with each having an increasing void volume from layer 321 to 319 to 317. Selection of the appropriate characteristics will depend on the desired fluid flow.

For example, when it is desired that the working fluid have a driving force toward an electrode, placement of a graded porous flow field member such that the side having a lower void volume faces the electrode enhances the rate and uniformity of fluid flow toward the electrode. Conversely, when it is desired that the working fluid have a driving force away from an electrode, placement of a graded porous flow field member such that the side having a higher void volume faces the electrode enhances the rate and uniformity of fluid removal from the electrode. It is expected that placement of a graded porous flow field such that the side having a higher hydrophobicity faces the electrode will enhance the flow of water away from the electrode. Placement of a graded porous flow field such that the side having a higher hydrophilicity faces the electrode enhances the flow of water toward the electrode.

For example, layer 321 may be a screen or woven mesh as is known in the art, layer 319 a layer having a void volume less than layer 321 and comprising a porous support integrated with an electrically conductive material and, and layer 317 having a void volume less than layer 319 and comprising a porous support integrated with a hydrophilic polymeric material.

Alternatively, layer 321 may comprise a porous support integrated with a hydrophilic polymeric material, layer 319 a layer having a void volume greater than layer 319 and comprising a porous support integrated with a more hydrophilic material than layer 321, and layer 317 having a void volume greater than layer 319 and comprising a porous support integrated with a more hydrophilic material than layer 319.

Figure 4:
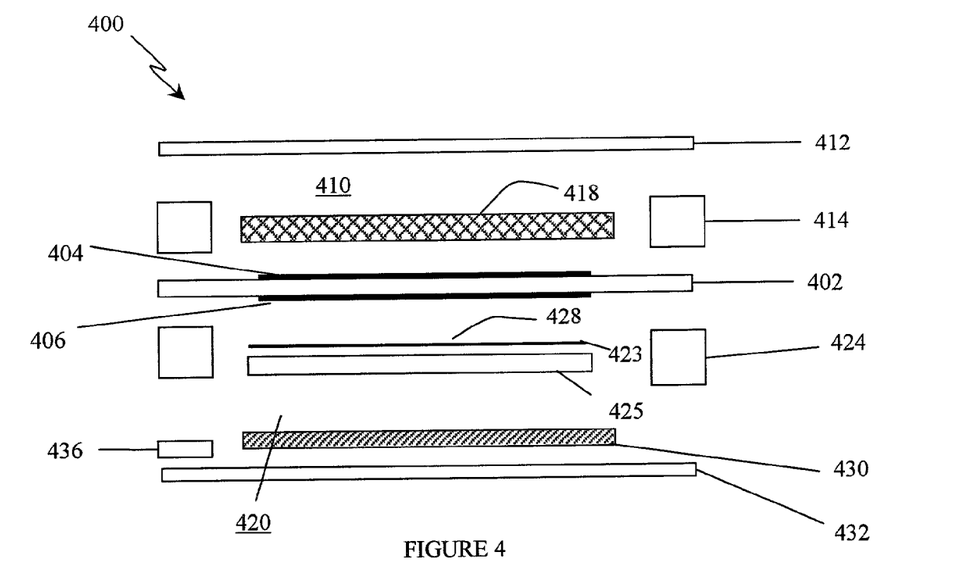
FIG. 4 is a schematic, cross-sectional diagram of another exemplary, graded porous flow field member in an electrochemical cell.

In yet another embodiment, a gradient is established as shown in FIG. 4, wherein layer 425 comprises a first porous sintered metal support having a first void volume, and layer 423 comprises a second porous sintered porous metal support having a second, different void volume. One or both of the sintered porous metal supports may or may not be integrated with an electrically conductive material or a polymer. Alternatively, layer 425 comprises a screen as is known in the art having a first void volume, and layer 423 comprises a second porous sintered porous metal support having a second, different void volume, wherein the sintered porous metal support may or may not be integrated with an electrically conductive material or a polymer. A suitable sintered porous metal support is formed from sintering 10 micron diameter fibers of the nickel alloy HASTELLOY to a density of 26%, and having a thickness of 0.012 inches. A woven or felt carbon fiber cloth may be used in place of the porous sintered metal support.

Figure 5:
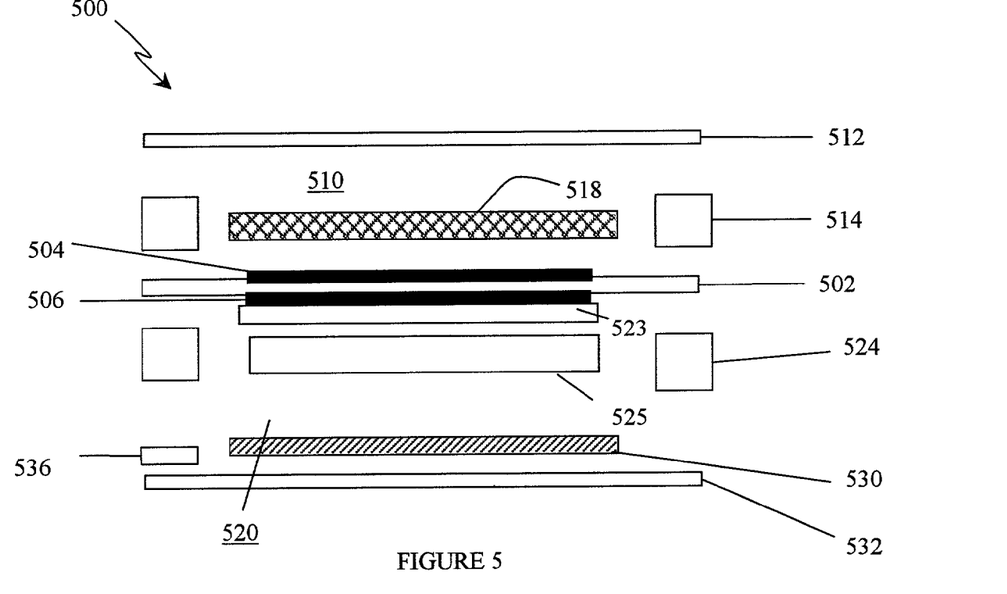
FIG. 5 is a schematic exploded, cross-sectional view of an electrochemical cell illustrating a plurality of porous supports oriented to enhance fluid flow.

In still another embodiment shown in FIG. 5, a flow field member 523 comprising an integrated, hydrophobic polymer/porous support is used in a fuel cell or a regenerative fuel cell to replace the gas diffusion layer commonly placed between the flow field and the catalyst. Such gas diffusion layers often comprise carbon paper or cloth, which are not robust to the conditions found in fuel cells or regenerative fuel cells, particularly on the oxygen (cathode) side of the cell. In this embodiment, flow field member 523 comprising a hydrophobic polymer (for example a polytetrafluoroethylene such as TEFLON) disposed on a porous support (for example a carbon fiber paper) is located in fluid communication with one side of proton exchange membrane 502 opposite an electrode 504. The hydrophobic polymer and/or the porous support may further comprise a catalyst as described above. Additional flow field members 525 may optionally be present, for example the flow field members described herein or a bipolar plate as is known.

In a preferred embodiment for managing fluid flow in a fuel cell or regenerative fuel cell having the configuration shown in FIG. 5, resultant water formed at cathode 506 has a flow force generally in a direction through cathode 506 away from membrane 502. Conversely, a gas (oxygen) will have a flow force toward the membrane. Accordingly, a hydrophobic flow field member 523 (in place of a gas diffusion layer) and/or 518 aids in removing water from cathode 506, and channeling oxygen toward cathode 86. Use of a hydrophobic flow field 523, 518 accordingly improves fluid flow characteristics of the cell, and thus improves voltage performance of the cell. Hydrophobic flow field member 523 may comprise a single layer. Preferably, hydrophobic flow field member 523 comprises at two layers, wherein the layer in closest proximity to the electrode has a greater void volume than the layer opposite the electrode, thereby enhancing flow away from the electrode. Such an arrangement further results in wicking water toward the outer diameter of the cell. In addition, or instead, layers forming a hydrophobic gradient may be used, wherein a layer having the greatest hydrophobicity is placed closest to the electrode, and a layer having less hydrophobicity is placed farther from the electrode.

Multiple (two or more) layers forming a flow field member can be attached to one another, or merely stacked in place. The multiple layers are generally pressed to a thickness of about 0.00050 to about 0.01 inches (about 0.0127 and about 0.254 mm), and preferably to a thickness of about 0.002 to about 0.0050 inches (about 0.0508 and about 0.127 mm).

The total porosity (i.e., total void volume) and the porosity gradient within a porous flow field member is that effective to achieve the desired degree of fluid flow under the pressure and temperature conditions within a particular electrochemical cell, and is readily determined by one of ordinary skill in the art. At minimum, the void volume allows axial fluid transfer (i.e., in the direction to and/or from the membrane electrode assembly). In general, the porosity is about 10% to about 80% void volume, and preferably about 40% to about 50% void volume.

Another useful feature of graded porous support comprising elastomeric material is that the component can then provide compression between the cell components. The compression enhances electrical contact thus decreases the resistance between cell components. It is possible, when using these graded porous supports, to eliminate pressure pads, thereby providing a cost savings. Furthermore, the porous flow field members also provide support to the MEA when operating at very high pressures. Such high pressures comprise up to and exceeding about 10,000 pounds per square inch (psi) under certain operating conditions, preferably about 50 to about 8,000 psi, more preferably from about 100 to about 6,000 psi, still more preferably about 200 to about 4,000 psi, and most preferably about 500 to about 2,000 psi.

An electrochemical cell employing such a porous support configuration can incorporate ports (not shown) to drain the water collecting within the flow field, into a phase separator (not shown), or other similar containment vessel. The phase separator can either be operated mechanically or using a solenoid valve fitted with a level sensor. The phase separator would allow water to drain into it without the electrode experiencing loss of oxygen side pressure. In the alternative, the separator can be drained differentially to induce a finite purge that would also aid in wicking water away from the electrode. This design and orientation of the porous flow field members can also be implemented with the other electrode of the cell.

The invention is further illustrated by the following non-limiting example, wherein a polymer-treated porous support was constructed from a titanium porous plate coated with a TEFLON® solution thus imparting hydrophobic characteristics. A hydrophobic polymeric solution was prepared using 8 grams of TEFLON® solution per 20 cubic centimeters of water. The solution was brushed on both sides of the plate and allowed to dry. The plate was then heated to 650° C. for 15 minutes and allowed to cool.

The various embodiments of the porous flow field members may be utilized within electrochemical cells operating under pressure differentials up to and exceeding about 10,000 pounds per square inch (psi) under certain operating conditions, preferably about 50 to about 8,000 psi, more preferably from about 100 to about 6,000 psi, still more preferably about 200 to about 4,000 psi, and most preferably about 500 to about 2,000 psi.

The electrochemical cells generally described herein utilize porous flow field members that are compatible with the electrochemical cell environments and can be utilized on either or both sides of the cell as support members (e.g., substitutes for screen packs, bipolar plates, or other support apparatus). The use and orientation of such porous flow field members in a cell environment can cause the cell to operate at a lower electrical resistance thereby leading to higher current output densities in the case of fuel cells or fuel cell operation, and increased energy efficiency in the case of electrolysis cells or electrolysis cell operation. Further, the porous flow field members should result in cell that remains structurally intact at very high operating pressures.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An electrochemical cell system, comprising:
   a first electrode;
   a second electrode;
   a membrane disposed between and in intimate contact with the first electrode and the second electrode;
   a first flow field in fluid communication with the first electrode, wherein the first electrode is disposed on a first side of the membrane;
   a second flow field in fluid communication with the second electrode, wherein the second electrode is disposed on a second side of the membrane opposite the first side; and
   a porous flow field member in fluid communication with the first flow field, wherein the porous flow field member comprises a porous support;
   wherein the porous support has a graded hydrophilicity, a combination of a graded hydrophobicity and graded porosity, or a combination of a graded hydrophilicity and graded porosity, and wherein the porous support is integrated with a polymer or a combination of a polymer and an electrically conductive material, wherein the polymer is an elastomer, and wherein the elastomer is threaded, woven, or stitched within the porous support; and
   wherein the porous support is a screen, a perforated sheet, a pierced sheet, a sintered metal cloth, an etched sheet, a felt, or a woven mesh comprising a material selected from the group consisting of niobium, zirconium, tantalum, titanium, nickel, cobalt, steel, mixtures comprising at least one of the foregoing materials, and alloys comprising at least one of the foregoing materials.

2. The electrochemical cell system of claim 1, wherein the polymer is selected from the group consisting of polytetrafluoroethylene, fluorinated ethylene propylene, polyvinylidinefluoride, ethylene chlorotrifluoroethylene copolymer, ethylene tetrafluoroethylene, perfluoroalkoxy, tetrafluoroethylene perfluoromethylvinylether copolymer, and mixtures comprising at least one of the foregoing hydrophobic polymers.

3. The electrochemical cell system of claim 1, wherein the polymer is selected from the group consisting of proton conductive ionomers and ion exchange resins.

4. An electrochemical cell system, comprising: a first electrode;
   a second electrode;
   a membrane disposed between and in intimate contact with the first electrode and the second electrode;
   a first flow field in fluid communication with the first electrode, wherein the first electrode is disposed on a first side of the membrane;
   a second flow field in fluid communication with the second electrode, wherein the second electrode is disposed on a second side of the membrane opposite the first side; and
   a porous flow field member in fluid communication with the first flow field, wherein the porous flow field member comprises a porous support having a graded hydrophilicity, a combination of a graded hydrophobicity and graded porosity, or a combination of a graded hydrophilicity and graded porosity, and wherein the porous flow field member further comprises a catalyst; and
   wherein the porous support is a screen, a perforated sheet, a pierced sheet, a sintered metal cloth, an etched sheet, a felt, or a woven mesh comprising a material selected from the group consisting of niobium, zirconium, tantalum, titanium, nickel, cobalt, steel, mixtures comprising at least one of the foregoing materials, and alloys comprising at least one of the foregoing materials.

5. The electrochemical cell system of claim 4, wherein the catalyst is selected from the group consisting of platinum, palladium, rhodium, carbon, gold, tantalum, tungsten, ruthenium, iridium, osmium, alloys comprising at least on the foregoing materials, and mixtures comprising at least one of the foregoing catalysts.

6. The electrochemical cell system of claim 4, wherein the porous support comprises a material that is non-oxidizable at anodic potentials of less than about 4 volts.

7. The electrochemical cell system of claim 1, wherein the electrically conductive material is selected from the group consisting of niobium, zirconium, tantalum, titanium, cobalt, mixtures comprising at least one of the foregoing materials, and alloys comprising at least one of the foregoing materials.

8. The electrochemical cell system of claim 7, wherein the electrically conductive material comprises niobium.

9. The electrochemical cell system of claim 7, wherein the electrically conductive material comprises zirconium.

10. The electrochemical cell system of claim 7, wherein the electrically conductive material comprises tantalum.

11. The electrochemical cell system of claim 7, wherein the electrically conductive material comprises titanium.

12. The electrochemical cell system of claim 7, wherein the electrically conductive material comprises cobalt.

13. The electrochemical cell system of claim 4, wherein the electrically conductive material comprises niobium.

14. The electrochemical cell system of claim 4, wherein the electrically conductive material comprises zirconium.

15. The electrochemical cell system of claim 4, wherein the electrically conductive material comprises tantalum.

16. The electrochemical cell system of claim 4, wherein the electrically conductive material comprises titanium.

17. The electrochemical cell system of claim 4, wherein the electrically conductive material comprises cobalt.

* * * * *